United States Patent Office.

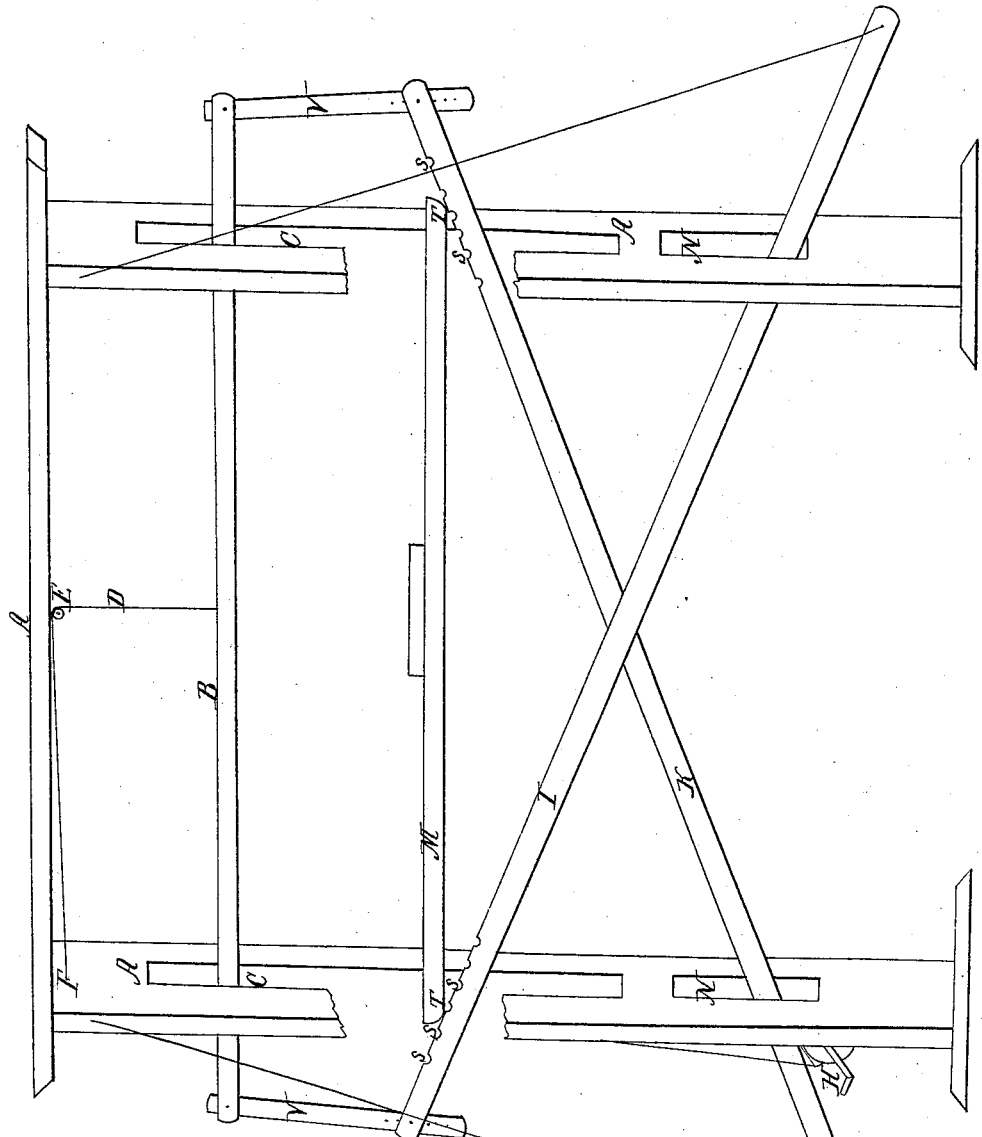

IMPROVEMENT IN CHEESE-PRESS.

WM. THOMAS AND WM. RHOADES, OF MUKWONAGO, WISCONSIN.

Letters Patent No. 60,438, dated December 11, 1866.

The Schedule referred to in these Letters Patent and making part of the same.

Be it known that we, WILLIAM THOMAS and WILLIAM RHOADES, of the town of Mukwonago, in the county of Waukeshaw, and State of Wisconsin, have invented a new and improved Cheese Press; and we do hereby declare that the following is a full, clear, and exact description of the construction and operation of the same, reference being had to the annexed drawings, making part of this specification.

The nature and object of this invention is to produce a press in which the weight of the cheese will do its own pressing, and that can be so adjusted as to admit the cheese to exert a greater or less weight upon itself.

The drawing represents a front elevation of our press.

A A is the frame, with portions of each post of the frame cut away to show other parts of the press more clearly. B is a cross-beam, working in the slots C C, which is readily raised or lowered by the rope D. This rope passes over the pulley at E through the post A at F; and around the windlass H, I and K are two movable levers passing through the posts A A, and so placed that they cross each other. They freely move in the slots C C and N N. M is a bed-piece, each end of which passes through the slots C C, and rest upon the levers I and K. T T are pawls, firmly attached to the bed-piece fitting into the notches S S S in each of the levers I and K. The levers I and K are united by means of the adjustable arms V V to the cross-piece B.

The operation of my machine is as follows:

The cheese is placed on the centre of the bed-piece M. The windlass H is unfastened when the weight of the cheese bears down the bed M, the cross-piece B, and the ends of the levers I and K. The cross-piece B travels faster than the bed-piece M, it being connected with the levers I and K by means of the arms V V. A greater or less pressure is brought to bear upon the cheese by inserting the pawls T T in notches S S at distances greater from the upper ends of the levers I and K, thus increasing the leverage between the particular notches in which the pawls are placed, and the lower ends of the arms V V. By this means we are able to make the cheese exert a pressure upon itself greater than its weight. The cheese is relieved from pressure by winding up the cord D on the windlass H.

What we claim as new, and desire to secure by Letters Patent, is—

The combination of the notched levers I and K, with the pawls T T, arms V V, and bed-piece M and cross-beam B.

WILLIAM THOMAS,
WILLIAM RHOADES.

Witnesses:
JAMES A. COWLES,
WM. H. SANGSTER.